United States Patent
Belov et al.

(10) Patent No.: US 11,261,135 B2
(45) Date of Patent: Mar. 1, 2022

(54) CHROMATE-FREE CERAMIC COMPOSITIONS WITH REDUCED CURING TEMPERATURE

(71) Applicants: Irina Belov, Zionsville, IN (US); Thomas F. Lewis, III, Zionsville, PA (US)

(72) Inventors: Irina Belov, Zionsville, IN (US); Thomas F. Lewis, III, Zionsville, PA (US)

(73) Assignee: Praxair S.T. Technology, Inc., North Haven, CT (US)

( * ) Notice: Subject to any disclaimer, the term of this patent is extended or adjusted under 35 U.S.C. 154(b) by 0 days.

(21) Appl. No.: 16/834,728

(22) Filed: Mar. 30, 2020

(65) Prior Publication Data

US 2020/0331815 A1    Oct. 22, 2020

Related U.S. Application Data (63) Continuation of application No. 16/163,893, filed on Oct. 18, 2018.

(51) Int. Cl.
| | |
|---|---|
| *C04B 41/50* | (2006.01) |
| *C04B 35/628* | (2006.01) |
| *C04B 35/74* | (2006.01) |
| *C04B 41/51* | (2006.01) |
| *B82Y 30/00* | (2011.01) |
| *B82Y 40/00* | (2011.01) |

(52) U.S. Cl.
CPC .... *C04B 41/5024* (2013.01); *C04B 35/62807* (2013.01); *C04B 35/74* (2013.01); *C04B 41/5155* (2013.01); *B82Y 30/00* (2013.01); *B82Y 40/00* (2013.01); *C04B 2235/3229* (2013.01); *C04B 2235/402* (2013.01); *C04B 2235/72* (2013.01)

(58) Field of Classification Search
CPC ....... C04B 14/30; C04B 20/008; C04B 22/04; C04B 28/26; C04B 35/74; C04B 35/62807; C04B 40/065; C04B 41/5024; C04B 41/5155; C04B 2103/0008; C04B 2111/00525; C04B 2111/10; C04B 2111/26; C04B 2111/28; C04B 2235/72; C04B 2235/402; C04B 2235/3229; C09D 1/02; C09D 5/103; C09D 183/02; C23C 24/085; B82Y 30/00; B82Y 40/00
See application file for complete search history.

(56) References Cited

U.S. PATENT DOCUMENTS 9,017,464 B2 *  4/2015  Belov .................... C23C 28/04
                                                         106/14.21

OTHER PUBLICATIONS

Kylie J. Mitchell et al., Atomically-precise colloidal nanoparticles of cerium dioxide, Nature Communications 8: 1445, DOI: 10.1038/s41467-017-01672-4 [2017].

* cited by examiner

*Primary Examiner* — Anthony J Green
(74) *Attorney, Agent, or Firm* — Nilay S. Dalal

(57) ABSTRACT

Hexavalent chromium-free slurries are provided that are capable of achieving a full cure at temperatures as low as 330-450 degrees F., thus making the coatings especially suitable for application on temperature sensitive base materials. The slurries are suitable in the production of protective coating systems formed by novel silicate-based basecoats that are sealed with novel phosphate-based topcoats. The coating systems exhibit acceptable corrosion and heat resistance and are capable of replacing traditional chromate-containing coating systems.

15 Claims, 6 Drawing Sheets

*SEM images with EDS spectra of basecoats cured at 450 F degrees / 2 hours:
the coatings applied from lithium doped potassium silicate- based slurries with Al particles and
with addition of Ce oxide cure accelerator*

*Fig. 1a Top view (magnification X1000)*     *Fig. 1c EDS spectra*

*Fig. 1b Cross-section (magnification X1000)*     *Fig. 1d EDS spectra*

*SEM images of Li-doped K Silicate based coatings cured at 450 degrees F / 2 hours with
addition of Ce oxide cure accelerator and burnished with $Al_2O_3$ media (magnification X1000)*

*Fig 2a Top view*     *Fig 2b Cross-section*

*Coating system of Example 1, cured at 450 degrees F / 2 hours and exposed to the Boiling water test: Cross - hatch (magnification X6) and Bend Adhesion tests*

*Coating system of Example 3, cured at 450 degrees F / 2 hours and exposed to the Boiling water test: Cross - hatch (magnification X6) and Bend Adhesion tests*

*Coating system of Example 3, cured at 450 degrees F / 2 hours after Salt Spray exposure: after 800 hours (a), 1,248 hours (b), 1,624 hours (c), and 2,870 hours (d)*

*Fig. 5a  Fig. 5b  Fig. 5c  Fig. 5d*

*Coating system of Example 3, cured at 450 degrees F / 2 hours after immersion in NaCl solution: after 100 hours (a), 240 hours, 432 hours (c) followed by adhesion tests (d)*

*Coating system of Example 1, cured at 450 degrees F / 2 hours and exposed to the immersion in $H_2O$ at 80°C for 100 hours: Visual appearance & Cross - hatch (magnification X6) and Bend Adhesion tests*

*Coating system of Example 3, cured at 450 degrees F / 2 hours and exposed to the immersion in $H_2O$ at 80°C for 100 hours: Visual appearance & Cross - hatch (magnification X6) and Bend Adhesion tests*

*Coating systems of Example 8 with Topcoat A (a) and Topcoat B (b), cured at 330 degrees F / 4 hours and exposed to the Boiling water test: Adhesion tests*

*Coating system of Example 9, cured at 330 degrees F / 4 hours after Salt Spray exposure: after 360 hours (a), 528 hours (b), 696 hours (c), and 1,114 hours (d)*

Coating systems of Example 8 cured at 330 degrees F / 4 hours and immersed in Skydrol 500 at 160°F for 3 hours: Cross - hatch (magnification X6) and Bend Adhesion tests with Topcoat A and Topcoat B Fig. 11a
with Topcoat A

Fig. 11c

Fig. 11b
a) with Topcoat B

Fig. 11d

Fig. 12 Coating systems of Example 8 cured at 330 degrees F / 2 hours and immersed in Royco 500 at 300°F for 100 hours: Cross - hatch (magnification X6) Adhesion tests with Topcoat A and Topcoat B Fig. 12a  Fig. 12c  Fig 12b  Fig. 12d
with Topcoat A          with Topcoat B

CHROMATE-FREE CERAMIC COMPOSITIONS WITH REDUCED CURING TEMPERATURE

RELATED APPLICATIONS

This application is a continuation-in-part of U.S. patent application Ser. No. 16/163,893, filed on Oct. 18, 2018, which is hereby incorporated by reference in its entirety.

FIELD OF THE INVENTION

The present invention relates to novel chromate-free (i.e., hexavalent chromium-free) slurries that are suitable in the production of protective coating systems formed by novel silicate-based basecoats and sealed with phosphate-based topcoats. More particularly, the coating systems of the present invention are capable of achieving a full cure at temperatures as low as 330-450 degrees F., thus making the coatings especially suitable for application on temperature sensitive base materials, such as ultrahigh strength steels, titanium and aluminum alloys. These coating systems exhibit acceptable corrosion and heat resistance and are capable of replacing traditional chromate-containing coating systems.

BACKGROUND OF THE INVENTION

Chromium-based aluminum-ceramic coating compositions have been well known and considered for decades as the industry standard for forming coatings which are highly corrosion-resistant and heat-resistant. U.S. Pat. No. 3,248,251 to Allen ("Allen patent") issued over forty years ago, which recognized and described the ability of aluminum-ceramic chromium-based coatings to exhibit resistance to corrosion, heat and abrasion while retaining adhesion and flexibility. Such attributes have continued to make aluminum-ceramic coatings widely used in a variety of applications. Today, these coatings are relied upon by original equipment manufacturers (OEM's) in the aircraft industry for protection of various aircraft engine, landing gear and other components subject to high temperature and corrosive environments. Department of Defense (DoD) depot facilities also use aluminum-ceramic coatings as part of their manufacturing for critically needed items. Additionally, the industrial power generation, automotive and various other industries routinely use aluminum-ceramic coatings as a high performance protective coating.

The conventional aluminum-ceramic coating typically consists of a chromate-phosphate binder that is filled with metallic aluminum powder. Upon curing, the binder forms a matrix that is embedded with the aluminum powder particles. The matrix provides mechanical integrity to the coating, while the chromate passivated aluminum pigment network imparts efficient corrosion protection. Burnishing the Al-filled coating by dry grit or glass bead-blasting compresses the coating to render it conductive, galvanically active and sacrificial (i.e., cathodically protective) to all steels. SermeTel W® is generally recognized in the industry as the performance standard for these types of such chromium-based aluminum-ceramic coatings. Depending on the particular application and service conditions, the coatings can be used alone to provide adequate corrosion protection.

Alternatively, the aforementioned coating can be utilized as a part of an overlay system, serving as a basecoat that is sealed with top coatings and/or sealers. By sealing porosity and voids in the basecoat, the top coating provides additional barrier protection, thereby extending the corrosion protective action of the whole overlay system, as well as enhancing its other functional properties (e.g., smoothness, hot water resistance, heat oxidation resistance, engine fluids resistance, etc.) and its visual appearance.

Inorganic binder-based topcoats for high temperature resistant coating systems, as known in the art, are customarily formed by a chromate-phosphate binder solution similar to that of the basecoat, but contain no metal particles. The topcoat composition may further contain metal oxide pigments that are chemically inert and heat resistant (such as $Al_2O_3$, $TiO_2$, $Cr_2O_3$, multicomponent oxide spinels, etc.). Upon curing, the topcoat forms a thin glass-ceramic type layer thus providing additional functional advantages.

In order to achieve an optimal performance of aluminum-ceramic coatings, the coatings are preferably cured at temperatures not lower than 500 degrees F., and preferably at 600-650 degrees F. The coatings that are not fully cured tend to show deficiencies in their functional performance, such as generally unsatisfactory adhesion to a substrate and generally unsatisfactory interlayer adhesion, reduced corrosion resistance, coating blistering in humid and corrosive environment, etc.

However, in some cases, there are temperature processing limitations, mostly imposed by a chemical nature and/or a type of a material of a substrate, that prevent coatings from being fully cured at the relatively high cure temperature of 500 degrees F. or higher to form a coating that can meet applicable criteria. Examples include components composed of materials that cannot be exposed to the normal cure temperatures required for SermeTel® coatings. Lower cure temperatures are required for many high-strength steels, titanium alloys and heat-treated aluminum alloys in a variety of applications to preserve mechanical properties and avoid damage and degradation of functional properties of such temperature-sensitive base materials.

Ultra-high strength martensitic steels are well-known for having cure temperature limitations imposed by the steel heat treatment process, which occurs mostly by a tempering regime to achieve a required combination of mechanical properties that are optimum for intended part service conditions. Tempering is a heat treatment technique applied to ferrous alloys to achieve greater toughness by decreasing the hardness of the alloy. The reduction in hardness is usually accompanied by an increase in ductility, thereby decreasing the brittleness of the metal. For these alloys, a lower tempering temperature will produce a harder and higher tensile strength part; however, this will reduce ductility, impact strength, create a service temperature limit and possibly also lower fatigue life.

It is known that the heat treatment process for achieving optimum tensile, toughness and fatigue characteristics of ultra-high strength low alloy steels consists of quenching in the range of 845-900 degrees C. and tempering in the range of about 200-300 degrees C. or even lower at about 160 degrees C., with the exact temperatures depending on the chemical composition of the alloy. In particular, for 300M high strength steel that is preferentially used in aircraft landing gear, airframe parts and other components serving under extreme loading conditions, a tempering temperature of about 300 degrees C. (i.e., about 570 degrees F.) is recommended; for example, tempering this alloy at 310 degrees C. (i.e., 590 degrees F.) gives a nominal Rockwell Hardness of 55 HRC (in "Ultrahigh strength steels for aerospace applications" by W. M. Garrison, JOM, v. 42, 1990, pp. 20-25, and in "Influence of tempering temperature on mechanical properties of ultra-high strength low-alloy steels" by J. Hornikova et. al. at www.phase-trans.msm.cam.ac.uk, 2005).

However, the tempering temperature used on the substrate material puts a strict limitation on the heat exposure tolerance of the alloy. In order to preserve optimal mechanical properties achieved through tempering, the tempering temperature cannot be exceeded. Thus, any further processing, such as application and cure of protective coatings on the components made of 300M should be performed at temperatures safely below 300-310 degrees C. (i.e., 570-590 degrees F.). OEM specifications require curing SermeTel® coatings applied onto 300 M components at 275-288 degrees C. (i.e., 525-550 degrees F.). For other ultra-high strength steel, tempering temperatures can be as low as 165-240 degrees C. (i.e., 330-460 degrees F.), thus limiting heat exposure tolerance to even lower temperatures.

Aluminum alloy components represent another case of cure temperature limitations imposed by the temperature tolerance of the base material. Aerospace Aluminum alloys used in aircraft parts (such as lipskins of nacelles for jet engines, leading edges of wings and tails, etc.) generally contain copper, which provides strength when heat treated. However, even AA2219 alloys that are considered heat tolerant, will lose strength and distort at temperatures higher than 232 degrees C. (i.e., 450 degrees F.). Thus, any coating systems applied for environmental protection of aircraft parts made of such alloys must be capable of undergoing a full cure below this temperature.

It is known in the field that the addition of certain chemical additive compounds in the chromate-phosphate based Al-containing coating slurries results in lower cure temperatures that can be employed to achieve a full cure of the protective coatings derived from these slurries. There are several patents, some of which granted as early as 1966 that describe employment of various additive compounds for this purpose.

U.S. Pat. No. 3,248,249 to Collins, Jr. discloses that the curing temperature of the chromate-phosphate based coating composition described in the aforementioned Allen patent can be reduced to 250-500 degrees F. by addition of a solid particulate material having a particle size of 0.1 micron or finer, such as colloidal silica or colloidal alumina particles.

U.S. Pat. No. 3,248,250 to Collins, Jr. discloses that the curing temperature of the chromate-phosphate based coating composition can be lowered by adding an alkali metal silicate to this composition.

As described and claimed by Collins, Jr. and Klotz, J. M. in U.S. Pat. No. 4,319,924, the addition of diethanolamine in the acidic aqueous coating slurry composition containing dissolved phosphate, dissolved dichromate, dissolved aluminium and inorganic solid particulate material creates an aqueous coating composition capable of being heat-cured into a water insoluble coating at temperatures within the range of about 180 degrees F. to about 225 degrees F.; the cured coating exhibits acceptable adhesion to steel and acceptable corrosion resistant properties.

U.S. Pat. No. 4,381,323 to Lowe, J. C. et al., also describes employing diethanolamine as a cure temperature reduction component for chromate-phosphate based aluminium ceramic slurry coatings.

A commercially available SermeTel® 984/985 coating system was developed and has been employed by several OEMs to provide galvanic, sacrificial corrosion protection for components composed of materials that cannot be exposed to the normal, relatively higher cure temperatures for SermeTel® coatings. The base coat layer in this system is also a chromate-phosphate based aluminium ceramic composition that employs a cure accelerator, in particular, from a class of quaternary ammonium hydroxides; the cure accelerator provides reduction of the full cure temperature to a minimum of 335 degrees F. (168 degrees C.). The corrosion-protective coating system has been successfully employed in the field for a relatively long time for many high-strength steels, titanium and heat-treated aluminium alloys in a variety of applications.

The commercial ShorCoat™ coating system is another commercially available corrosion and erosion resistant coating that employs a SermeTel® aluminium cermet basecoat with a reduced cure temperature; this basecoat is employed in combination with an aluminium-silicone paint topcoat. The coating system has been developed to protect aluminium alloy lipskins and other nacelle components that operate in a corrosive, erosive and aircraft de-icing conditions (i.e., cyclic heat). U.S. Pat. No. 6,171,704 to Mosser M. F., et. al. discloses this coating system.

Notwithstanding all the developmental efforts and longstanding history of employing aluminum-ceramic coatings with reduced cure temperatures, the major shortcoming of these coatings is that the coating slurries contain hexavalent chromium Cr (VI). Hexavalent chromium Cr (VI) has been identified as an environmentally hazardous material of concern. Consequently, it has been targeted for elimination in accordance with recent changes in the EU REACH regulations, as well as the respective policies of the DoD, Air Force and various OEM's.

In response to the identification of hexavalent chromium Cr(VI) as an environmentally hazardous material, various Cr-free coatings have been investigated as potential replacement coatings. However, the development of Cr (VI)-free alternatives have focused mostly on the aluminum-ceramic coatings with a cure temperature of higher that 500° F., and preferably 600-650° F.

For instance, one alternative Cr-free coating disclosed in U.S. Pat. No. 7,993,438 to Mosser et al. is an aluminum ceramic basecoat layer having a phosphate-based binder composition. The coating when employed in conjunction with a Cr (VI)-free top coating, provides application properties (e.g., thickness, roughness, galvanic activity) and performance (e.g., salt spray corrosion resistance, high temperature heat oxidation resistance, erosion resistance, mechanical properties) comparable to the benchmark coating systems with SermeTel basecoat. However, when used as stand-alone basecoats, these coatings developed a red rust in the scribe and the field when subject to testing of up to 1000 hours in the Salt Spray test per ASTM B117. Another drawback of this approach stems from a significant interaction of aluminum particles with the phosphate binder in a water-based slurry in the absence of Cr (VI) species that have a passivating effect on aluminum metal. As a result of this adverse interaction, the basecoat slurry cannot be maintained as a "one-part" composition, in which all of the constituents can be mixed together into a single formulation. Rather, the slurry must be maintained in storage as a two-part slurry, in which the aluminum powder is maintained separate from the aqueous binder, until the point of use when the binder and Al can be mixed. However, the pot life of the mixed slurry is only about 8-20 hours, beyond which a rapid deterioration of the mixture is observed, and that manifests itself in agglomeration of Al particles leading to a significant increase in the particle size. Thus, to avoid the adverse interaction of the aluminum particles with the phosphate binder, the slurries disclosed in U.S. Pat. No. 7,993,438 must undesirably remain a two-part composition that is intended to be mixed together immediately before the coating application and used in a short period of time. These limitations are a significant disadvantage in a production type environment.

As another alternative, aluminum ceramic coatings with silicate-based binders have been considered. One type of Cr-free, silicate-based binder is generally described in U.S. Patent Pub. No. 2006/0166014. However, basecoat performance is dependent upon layer thickness, with increased coating thicknesses to at least 2 mils being required for sufficient corrosion resistant properties, A need for improved one-part Cr-free coatings which can provide advantageous mechanical and functional properties, including corrosion and heat resistance, has been successfully addressed by the inventions disclosed in U.S. Pat. Nos. 9,017,464; 9,322,101; and 9,394,448 to Belov, I. et. al. ("Belov patents"), each of which is hereby incorporated by reference in their entirety, respectively, for all purposes. The inventions disclosed in each of the Belov patents relate, in part, to a slurry formulation that is used to produce coatings with superior functional properties that are particularly advantageous for aerospace applications, but not limited thereto.

The disclosed slurry formulation in the Belov patents employs a chromium-free lithium-doped potassium silicate binder in combination with an aluminum powder. The aluminum or aluminum alloy powder and the binder are contained as a one-part composition, in which all constituents are pre-mixed in a predetermined weight ratio into a single formulation. The one-part composition remains sufficiently stable to exhibit relatively long shelf-life in comparison to the prior art alternatives. When applied to a substrate in accordance to the process disclosed in the Belov patents, the slurry produces a coating layer that is continuous, dense and defect-free, with the composition comprising a Cr(VI)-free ceramic matrix formed by a lithium doped potassium silicate-binder and a plurality of aluminum particles embedded within the matrix. The ceramic coating exhibits improved functional properties, and, in particular, resistance to corrosion and heat exposure while retaining adhesion and flexibility.

However, a method for applying this coating onto a substrate, as disclosed in U.S. Pat. No. 9,322,101 comprises utilizing cure temperatures of higher that 500 degrees F., preferably 600-650 degrees F., to produce fully cured Cr (VI)-free coatings from the aforementioned slurries. When these coatings are cured at reduced temperatures, it has been observed by Applicants, that an incomplete cure process results in inferior adhesion and functional properties of the coatings, such as insufficient resistance to high humidity, blistering and delamination—under even a relatively short exposure to the Salt Spray test, etc.

To overcome the problems stated hereinabove, Applicants' U.S. patent application Ser. No. 16/163,893, which is incorporated herein by reference in its entirety for all purposes, relates to the novel Cr-free basecoat compositions which are chromium-free and methods that are suitable in the production of novel protective coatings exhibiting acceptable corrosion and heat resistance. The coatings disclosed are capable of achieving a full cure at temperatures as low as 350-450 degrees F., thus making the coatings especially suitable for application on temperature sensitive base materials, such as ultrahigh strength steels, titanium and aluminum alloys. These coatings with a reduced cure temperature are therefore capable of replacing legacy Cr(VI)-containing basecoats with reduced cure temperature, such as commercial SermeTel® 984 coating. Specifically, these novel basecoat compositions disclosed in U.S. patent application Ser. No. 16/163,893 are based on an aqueous solution of lithium-doped potassium silicate binder in combination with an aluminum or aluminum alloy powder, zinc powder or a combination thereof. Applicants discovered that by the inclusion of a colloidal solution of a nano-sized ceria as a cure accelerator, the basecoat compositions disclosed in Applicants' U.S. patent application Ser. No. 16/163,893 achieved a full cure at temperatures as low as 350-450 degrees F.

Although the lithium-doped potassium silicate binder based basecoat compositions with reduced cure temperatures, as described in Applicants' parent U.S. patent application Ser. No. 16/163,893, have acceptable functional performance when used as a stand-alone coating, it would be desirable to achieve additional enhancement of the functional properties of the chromium-free basecoats disclosed in the parent U.S. patent application Ser. No. 16/163,893, such as, by way of example, improved surface smoothness, increased corrosion protection, water resistance, heat oxidation resistance, etc. by employing these basecoats in conjunction with protective top coatings.

Chromate-free lithium-doped potassium silicate binder based basecoats of the parent U.S. patent application No. Ser. No. 16/163,893 demonstrate significant advantages to the chromate-free basecoat compositions of the prior art. However, there are currently no known topcoats which are suitable for such basecoats. Hence, there is a need to develop top coating compositions that are compatible with these basecoats. This, in turn, will allow creation of chromate-free basecoat-topcoat coating systems with improved functional properties, including corrosion, heat and oxidation resistance, for these chromate-free basecoat-topcoat coating systems to serve as an environmentally friendly alternative to legacy low-cure SermeTel® systems that contain hexavalent chromium species, such as the SermeTel® 984/985 coating system.

SUMMARY OF THE INVENTION

The invention relates, in part, to slurry formulations used to produce coating systems with special properties. It has been found that utilizing a chromium-free silicate-based basecoat that is sealed with a hexavalent chromium-free phosphate-based top coat produces a multi-layer coating system exhibiting acceptable corrosion and heat resistance and which is capable of replacing traditional chromate-containing coating systems. The coating systems of the present invention can achieve a full cure at the temperatures below 500 degrees F., and as low as 330 degrees F., thus resulting in a coated product that is particularly advantageous for aerospace parts made of the materials with limitations for heat exposure temperatures.

In a first aspect, an aqueous slurry composition for the production of a multilayer coating on a substrate, comprising: a basecoat slurry, comprising: a basecoat binder comprising an aqueous solution of lithium doped potassium silicate, the binder characterized by an absence of hexavalent chromium (VI); an aluminum powder or an aluminum alloy powder incorporated into the binder; and a cure catalyst comprising nano-sized cerium oxide colloidal solution; and a topcoat slurry, comprising: a topcoat binder comprising an aqueous solution of a water-soluble phosphate-based compound, nitrate anions and a water-soluble compound of trivalent chromium (III); a cure accelerating amine; wherein the topcoat slurry is characterized by an absence of hexavalent chromium (VI).

In a second aspect, a multilayer coating composition, comprising: a substrate; a basecoat on said substrate, said basecoat comprising: a ceramic basecoat matrix not containing hexavalent chromium, said ceramic basecoat matrix formed by a silicate binder, wherein said silicate binder is a potassium silicate doped with lithium; a plurality of aluminum-containing particles embedded within said ceramic basecoat matrix; and a cerium-containing compound, said cerium-containing compound impregnated into the ceramic basecoat matrix as a cerium-containing phase; a topcoat, said topcoat comprising: a topcoat ceramic matrix formed by curing an aqueous binder, said aqueous binder comprising a phosphate-based compound, nitrate containing species and a trivalent chromium (III) compound; a cure accelerating amine; wherein the topcoat is characterized by an absence of hexavalent chromium (VI).

In a third aspect, a method for applying a coating system onto a substrate, comprising: applying an aqueous one-part basecoat slurry onto a surface of the substrate to form an applied layer, said aqueous one-part basecoat slurry comprising a lithium doped potassium silicate binder, the binder characterized by an absence of hexavalent chromium (VI); and an aluminum-containing powder incorporated into the binder; treating the applied layer of the aqueous one-part basecoat slurry with a colloidal solution of a nano-sized cerium oxide to form a basecoat layer; curing the basecoat layer; applying a topcoat slurry onto the basecoat layer to form a topcoat layer, said topcoat slurry comprising an aqueous solution of a water-soluble phosphate-based compound, nitrate containing species, a compound of trivalent chromium (III) and a quaternary amine cure accelerator, the topcoat slurry characterized by an absence of hexavalent chromium (VI); curing the topcoat layer.

BRIEF DESCRIPTION OF THE DRAWINGS

The objectives and advantages of the invention will be better understood from the following detailed description of the preferred embodiments thereof in connection with the accompanying figures.

DETAILED DESCRIPTION OF THE INVENTION

The relationship and functioning of the various elements of this invention are better understood by the following detailed description. However, the embodiments of this invention as described below are by way of example only.

The detailed description contemplates the features, aspects and embodiments in various permutations and combinations, as being within the scope of the disclosure. The disclosure may therefore be specified as comprising, consisting of or consisting essentially of, any of such combinations and permutations of these specific features, aspects, and embodiments, or a selected one or ones thereof.

Aqueous compositions of the present invention, though especially suitable for temperature-sensitive substrates, can be successfully used to apply a protective overlay coating system onto various solid substrates, including, by way of example, ferrous alloys, nickel alloys, nickel-cobalt alloys, and other metallic materials (such as aluminum alloys, cobalt alloys, etc.) and nonmetallic (such as ceramics). While metal substrates are preferred, any solid substrate may be suitable for the application of the coating of the present invention, provided that the solid substrate is capable of withstanding corresponding coating processing temperatures.

The present invention recognizes that employment of a topcoat raises a concern of chemical compatibility between a basecoat and a topcoat. Namely, during topcoat application, the liquid topcoat slurry is coming into direct contact with the previously applied basecoat layer. Hence, for a topcoat to provide additional protection and overall enhancement of functional performance of the coating system, the contact of the top coat slurry with the basecoat layer should not cause any deleterious chemical interaction neither with aluminum metal particles nor with a binder matrix of the basecoat.

As was previously found by the Applicants, the chromate-free phosphoric-acid based top coatings of the prior art may not be chemically compatible with the basecoat containing lithium-doped potassium silicate binder. For instance, the prior art chromate-free top coating composition, as disclosed in U.S. Pat. No. 6,224,657, which pertains to an aqueous solution containing phosphate ions and trivalent chromium Cr(III) ions, is efficient in enhancing functional properties of a chromate-free phosphate-based basecoat composition of U.S. Pat. No. 7,993,438. However, Applicants have observed that application of the prior art top coating slurry of U.S. Pat. No. 6,224,657 onto the basecoat disclosed in the U.S. Pat. No. 9,017,464 to Belov et. al., (pertaining to a basecoat composed of a lithium-doped potassium silicate binder matrix with aluminum particles embedded within the matrix), created an overlay system that performed poorly. Specifically, severe blistering of the coating was observed after about 250 hours of Salt Spray exposure. As such, it was concluded that, the top coating composition of the prior art was not chemically compatible with the silicate-based matrix of the basecoat disclosed in U.S. Pat. No. 9,017,464.

In addition, because the basecoat of Applicants' invention in the U.S. patent application Ser. No. 16/163,893 employs an aqueous slurry composition that contains a cure catalyst comprising nano-sized cerium oxide colloidal solution, in which the slurry composition produces a basecoat layer that is fully cured at the temperatures below 500 degrees F., it is of utmost importance that the topcoat also will be capable of achieving a full cure at temperatures below 500 degrees F., and more preferably as low as 330-350 degrees F., in order for the top coat to provide additional protection and overall enhancement of functional performance of the coating system on temperature-sensitive substrates.

Accordingly, the selection of a compatible hexavalent chromium-free topcoat for the basecoat layer disclosed in the U.S. patent application Ser. No. 16/163,893 whereby the topcoat layer is capable of achieving a full cure at reduced temperatures, is a design need that has not been successfully addressed until emergence of the present invention.

As used herein and throughout the specification, the term "chemically compatible" means that there is no adverse chemical interaction taking place between a top coating slurry and lithium doped potassium silicate matrix and/or metal aluminum particles which constitute the basecoat layer in which such adverse chemical interaction could lead to deterioration in functional performance of the coating system.

As used herein and throughout the specification, the term "reduced cure temperatures" means that that the topcoat, as well the whole coating system composed of a basecoat and a top coat, is capable of achieving a full cure at the temperatures below 500 degrees F., and more desirably as low as 330-350 degrees F.

It was unexpectedly discovered in the present invention that the chromate-free phosphate based acidic top coating slurries are chemically compatible with the basecoats disclosed by the Applicants in the U.S. patent application Ser. No. 16/163,893. Particularly, the basecoats comprise a ceramic matrix formed by a silicate binder. The silicate binder is a potassium silicate doped with lithium. A plurality of aluminum-containing particles are embedded within said matrix. A cerium-containing phase is impregnated into the ceramic matrix. Not to be bound by any theory, Applicants suggest that the presence of a cerium-containing phase renders desired chemical compatibility between the lithium-doped potassium silicate matrix with embedded Al particles and chromate-free phosphoric-acid based top coatings. As will be demonstrated further in the Examples, when the basecoats produced from the slurries with employment of a colloidal solution of nano-sized cerium oxide particles as a cure accelerator are sealed with hexavalent chromium-free top coats produced from the acidic aqueous slurries containing phosphate ions and dissolved Cr(III) nitrate, the resultant basecoat-topcoat coating systems demonstrated acceptable adhesion to the substrates and interlayer adhesion, as well as acceptable corrosion resistance for over 1,000 hours of the Salt Spray and high humidity exposure, resistance to boiling water and engine fluids.

FIGS. 1(a), 1(b), 1(c) and 1(d) present a microstructure of the basecoats used in the present invention. As seen from SEM/EDS top-view and cross-section data, in the cured coatings of the present invention, the Ce-containing phase is derived from the treatment with the colloidal solution of nano-sized $CeO_2$ and is distributed throughout the whole coating depth and substantially concentrated on the surface of Al particles embedded in the coating matrix. Not to be bound by any theory, Applicants believe that the discovered compatibility of the basecoat used in the present invention with the topcoat slurries of the present invention is a result of the Ce-containing phase on the surface of aluminum particles of the basecoat hindering their adverse chemical interaction with the acidic slurry, thus providing basecoat-topcoat compatibility in the coating systems of the present invention.

Another problem that has been resolved by the Applicants in the present invention is a need to achieve a full cure of the coating system of the present invention at reduced cure temperatures below 500 degrees F., and more desirably at or below 350 degrees F.

As mentioned hereinabove, it was known in the art that acidic chromate-phosphate based binders (i.e. binders that contain hexavalent chromium) could achieve cure temperature reduction by addition of diethanolamine (U.S. Pat. No. 4,319,924 by Collins, Jr. et. al. and U.S. Pat. No. 4,381,323 to Lowe, J. C. et al). The addition of diethanolamine reduces hexavalent chromium to trivalent chromium, thus accelerating the cure of hexavalent chromium containing acidic binders. However, the prior art did not describe or suggest the utilization of amines as cure accelerators for Cr(VI)-free acidic phosphate-based binders.

It was discovered by Applicants that the top coat composition of the present invention, when applied on the basecoats disclosed in Applicants' U.S. patent application Ser. No. 16/163,893, can achieve a full cure at temperatures below 500 degrees F. by employing amines as cure accelerators into the top coat slurry compositions of the present invention. In particular, the addition of quaternary amines, otherwise called quaternary ammonium hydroxides, such as for example tetramethyl ammonium hydroxide $(CH_3)_4NOH$ (common name TMAH), triethylmethyl ammonium hydroxide $(CH_3CH_2)_3(CH_3)NOH$, diethyldimethyl ammonium hydroxide $(CH_3CH_2)_2(CH_3)_2NOH$, into the chromate-free phosphoric-acid based topcoats was found to be very efficient. As will be demonstrated by Examples, these coating systems can achieve a full cure at the temperatures below 500 degrees F., and as low as 300-350 degrees F., thus exhibiting excellent protective properties. Other suitable cure accelerating amines not described herein are also contemplated by the present invention.

In accordance with one aspect of the present invention, an aqueous slurry composition is provided for application of a top coating/sealant on the surface of the Cr-free lithium-doped potassium silicate basecoat described in the parent U.S. patent application Ser. No. 16/163,893. The top coating slurry comprises an acidic aqueous solution containing phosphate anionic species, nitrate anions and trivalent chromium Cr(III) cations. The slurry also comprises additional compounds that provide cationic species, such as magnesium and aluminum, whereby said compounds are dissolved in the acidic aqueous slurry to adjust the pH of the slurry into a desirable range of about 1-2.5.

Phosphate ions may be introduced in the top coating slurry of the present invention by any suitable water-soluble phosphate compound. Preferably, orthophosphoric acid and its aqueous solutions are employed as a cost-efficient, readily available and customary source of phosphate ions. Applicants determined that the content of phosphate anions in the topcoat slurry compositions of the present invention, as given in the form of $H_3PO_4$, is preferably in the range of 10-35 weight %, more preferably in the range of 15-30 weight % and most preferably in the range of 20-25 weight %, where the weight percentages are based on an overall weight of the top coat slurry.

Trivalent chromium Cr (III) cations and nitrate anions may be introduced by any suitable soluble nitrate compound and any suitable soluble Cr (III) compound. Preferably, trivalent chromium nitrate, such as Cr $(NO_3)_3.9H_2O$ is employed. Such compound is a water-soluble salt that advantageously introduces both Cr (III) cations and nitrate anions simultaneously. It was determined by the Applicants that the content of trivalent chromium Cr (III) cations and nitrate anions in the topcoat slurry compositions of the present invention, when provided in the form of Cr $(NO_3)_3$, should be in the range of 1-20 weight %, preferably in the range of 2-10 weight %, most preferably in the range of 4-7 weight %, where the weight percentages are based on an overall weight of the top coat slurry.

Applicants determined the undesirability of introducing Cr(III) cations by reduction of hexavalent chromium species with hydrogen peroxide, as disclosed in the prior art, such as in U.S. Pat. No. 6,224,657. The Applicants observed that the reaction of Cr(VI) with $H_2O_2$ is reversible and the reduced species oxidized back to hexavalent Cr (VI) with time.

Applicants also found that in the acidic topcoat compositions of the present invention, chromium cations are stable in their trivalent Cr (III) state and there is no oxidation reaction occurring. Namely, Cr(III) cations do not undergo conversion in time to any hexavalent chromium species. Applicants proved by colorimetric analysis that Cr (VI) species content in the solution stayed below a detection limit of 1 ppm even after several months. The data will be shown in the Examples.

The topcoat slurry composition can be pigment-free or can further comprise metal oxide pigment particles; these are preferably micron-sized particles that are chemically inert and heat resistant. Suitable examples include $Al_2O_3$, $TiO_2$, $Cr_2O_3$, multicomponent oxide spinels, and the like. The pigment particles are insoluble in the binder and form an aqueous dispersion. A choice of a particular suitable metal oxide pigment or a mixture of pigments is determined, at least in part, by imparting specific and desirable functional properties of a top coating and the coating system as a whole. As an example, white titanium oxide $TiO_2$ or green Cr(III) oxide compound $Cr_2O_3$ provide extraordinary chemical and thermal resistance, when incorporated into the binder, thus further enhancing protective properties of the whole coating system.

Optionally, small additions (~1-2 wt. %) of colloidal or fumed (so-called pyrogenic) metal oxides to the top coating slurry composition can be employed. These metal oxides, such as fumed silica $SiO_2$, fumed alumina $Al_2O_3$ or fumed titania $TiO_2$ are composed of fine primary nanoparticles that range in size from about 5 nm to about 100 nm. Contrary to micron-sized metal oxide pigment particles, these colloidal or fumed oxide particles are not fully inert in aqueous binder solutions and in particular, in the binder solutions of the present invention. Furthermore, because the colloidal or fumed oxide particles have very high surface areas e.g., up to 100 $m^2$/gram and higher), they are prone to formation of various surface active phases, and these phases might have an impact on the properties of a cured coating. Fumed metal oxides may be produced by pyrogenic processes and are commercially available under trade names of Cab-O-Sil® (Cabot Corporation) or AeroSil® and Aeroxide® (Evonic Degussa Corporation) and the like. It was determined by Applicants that the addition of about 1 weight % of Cab-O-Sil® M5 fumed silica was beneficial, and surprisingly the addition of Aeroxide® $TiO_2$ (of about 1 weight %) was more beneficial for further enhancement of functional performance of the coating system of the present invention.

Also, optionally, other functional additives known in the art can be incorporated into the binder. By way of example, small amount (~1-2 wt. %) of boron oxide $B_2O_3$ can be introduced into the binder solution. It is well known in the art of ceramics and glass ceramics that the physical and the mechanical properties of phosphate binders-based matrixes are improved by $B_2O_3$ modification, probably due to formation of boron phosphate $BPO_4$ phosphate phases.

Cure accelerating quaternary ammonium hydroxides, in particular tetramethyl ammonium hydroxide (TMAH), methyltriethylammonium hydroxide (MTEAH) or tetrabutylammonium hydroxide (TBAH), when added to the chromate-free phosphoric-acid based topcoat slurries of the present invention, were found to be efficient for catalyzing the cure process. As will be demonstrated in the Examples, a fully cured topcoat layer was produced at a temperature as low as 330 degrees F. The amount of the cure accelerating quaternary ammonium hydroxide required to catalyze a cure of the topcoat slurries of the present invention was found to be in the range of 0.1-5.0 weight %, preferably about 0.5-3.0 weight %, and more preferably about 0.8-1.5 weight %, where all weight %'s are based on the total weight of the topcoat slurry. TMAH, MTEAH and other quaternary ammonium hydroxides are strong bases, and, as a result, in order to avoid a pH shock that can happen when a strong base is added to an acidic solution, it is preferable to dissolve the strong bases in water to prepare and employ their diluted solutions. As an example, such aqueous solutions of quaternary ammonium hydroxides are commercially available from SACHEM Inc. under a trade name Avanta™AC 4343 (20 weight % TMAH), Avanta AC™4470 (20 weight % MTEAH). Other commercially available sources can also be used.

Surfactants, as well as small additions of suitable organic solvents known in the art can also be employed to improve properties, such as, for example, slurry sprayability, substrate wetting and film forming properties.

The slurry compositions of the present invention can be applied to a substrate by any number of conventional application techniques known in the art, such as by spraying, brushing, dipping, dip-spinning and the like. The applied layer is dried, and then cured. The binder solution polymerizes and solidifies under a drying and curing cycle to form a continuous matrix with acceptable mechanical strength, flexibility and chemical resistance. Aluminum particles are embedded in the matrix of the basecoat, and metal oxide particles are embedded in the matrix of the topcoat.

To form the coating systems of the present invention, after the Li-doped K silicate binder basecoat that employs nano-ceria cure accelerator applied to a substrate and cured to form a basecoat layer, as described in the parent U.S. application Ser. No. 16/163,893 the basecoat layer is treated to make it electrically conductive by any of the treatments widely used in the art for this purpose, such as, for example, burnishing with an abrasive media, such as aluminum oxide grit, at low processing pressure. The treatments therefore render the base coatings used in the multilayer coating system of the present invention galvanically protective against corrosion to an underlying substrate.

The effect of the basecoat burnishing with abrasive media was investigated and described in detail in the parent U.S. application Ser. No. 16/163,893. In general, the energy imparted to the coating from the pressurized media particles during the burnishing results in flattening of the aluminum particles and densification of the coating, thus creating partial closure of the pores. These changes provide continuous contact between the aluminum particles, thereby rendering the coatings conductive (e.g., measurements of less than 5Ω can be typically obtained); the electrical resistance of grit-burnished coatings is measured by a standard resistivity meter with the probes being placed on the surface of the coating one inch apart.

As recognized in the art and as described in sufficient detail in the parent U.S. application Ser. No. 16/163,893, it should be understood that activation of the base coat used in the present invention via burnishing with an abrasive media can be carried out in two different process step sequences. Either, the burnishing can be done as a final step of the application process (this process sequence is commonly referred to as Class 4 activated basecoats) or in-between the coating layers, such as after curing the first layer of the coating, and then applying and curing the second layer of the coating. In the latter case, the first layer of the coating will be made conductive, thus capable of providing galvanic corrosion protection, whereas the second layer of the coating will stay non-conductive; as a result, overall sacrificial activity will be reduced and longer lasting.

Figure 1A:
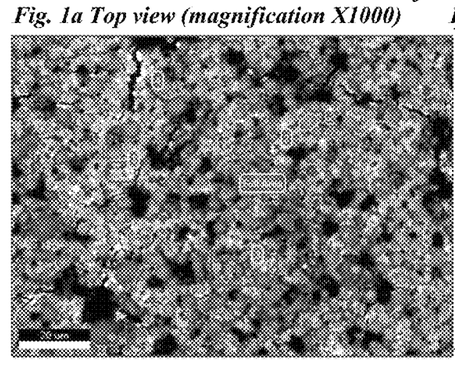
FIGS. 1(a) and 1(b) show top view and cross-section SEM images (at a magnification of ×1000) of the basecoat used in the present invention whereby marks on the SEM images indicate areas from which elemental composition data were collected. The coating has Li-doped potassium silicate matrix filled with Al particles, comprises a Ce containing phase and was cured at 450 degrees F. for 2 hours.
Figure 1B:
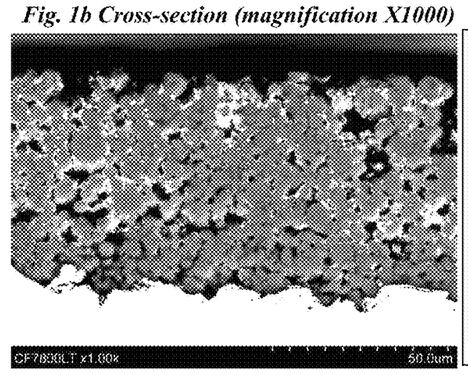
Figure 1C:
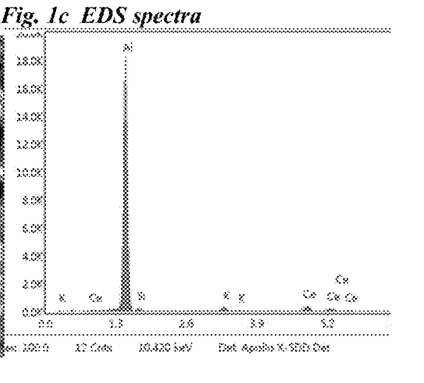
FIG. 1(c) shows the EDS spectra for FIG. 1(a) and FIG. 1(d) shows the EDS spectra for FIG. 1(b)
Figure 1D:
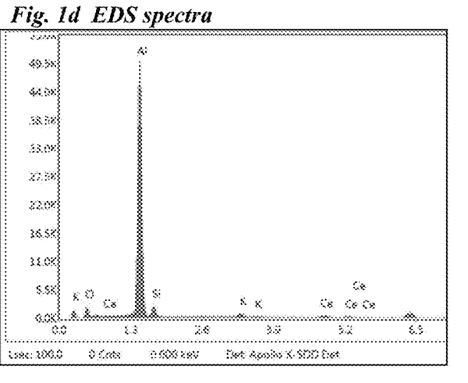
Figure 2A:
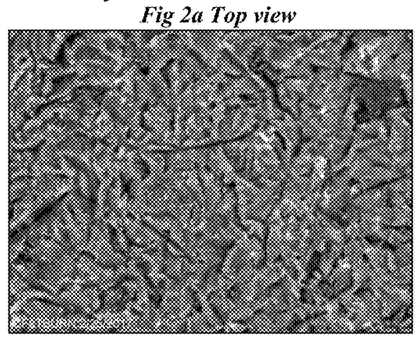
FIGS. 2(a) and 2(b) show top view and cross-section SEM images (at a magnification of ×1000) of the basecoat used in the present invention that was cured at 450 degrees F. for 2 hours and then was burnished with aluminum oxide grit (220 mesh size grade)
Figure 2B:
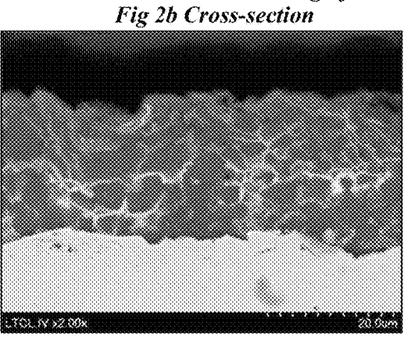
Figure 3A:
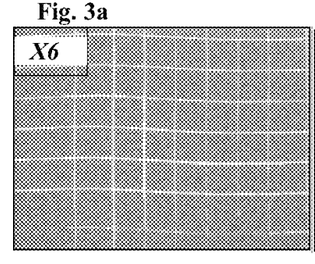
FIGS. 3(a), 3(b) 3(c) and 3(d) show results of adhesion tests of chromate-free coating systems of the present invention cured at 450 degrees F. for 2 hours and exposed to boiling water; the coating system employs Topcoat A that was pigment-free as described in detail in Example 1; Topcoat A was applied on the basecoat used in the present invention after said basecoat was burnished per Class 3 and Class 4 process, respectively.
Figure 3B:
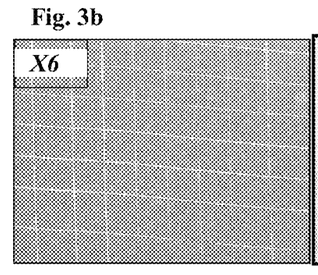
Figure 3C:
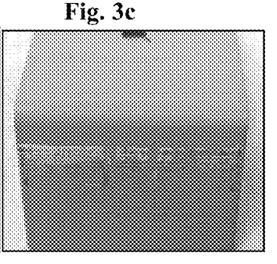
Figure 3D:
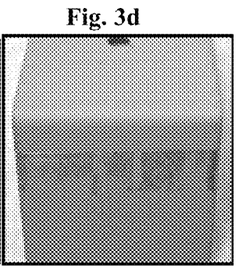
Figure 4A:
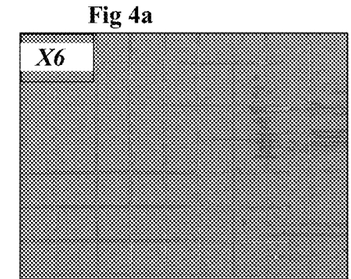
FIGS. 4(a), 4(b), 4(c) and 4(d) show results of adhesion tests of chromate-free coating systems of the present invention cured at 450 degrees F. for 2 hours and exposed to boiling water; the coating system employed Topcoat B that was pigmented with $TiO_2$ particles as described in detail in Example 3; Topcoat B was applied on the basecoat used in the present invention after said basecoat was burnished per Class 3 and Class 4 processes, respectively.
Figure 4B:
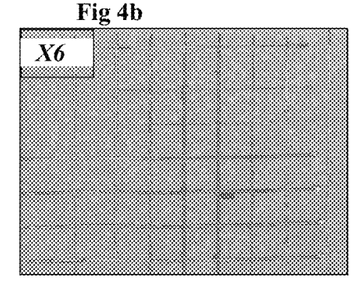
Figure 4C:
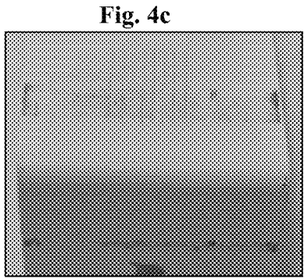
Figure 4D:
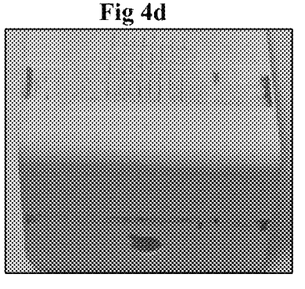
Figure 5A:
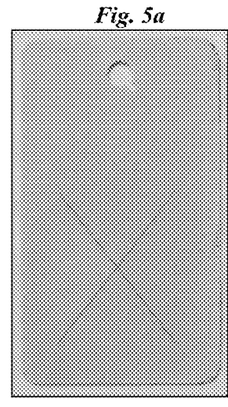
FIGS. 5(a) through 5(d) show salt spray test results for a chromate-free coating system of the present invention with Topcoat B of Example 3 after 800, 1,248, 1,624 and 2,870 hours of exposure.
Figure 5B:
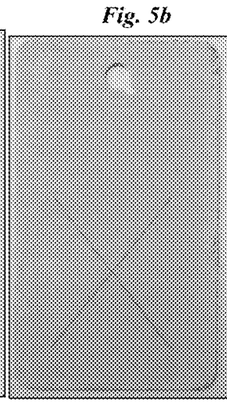
Figure 5C:
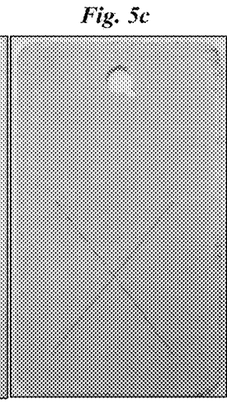
Figure 5D:
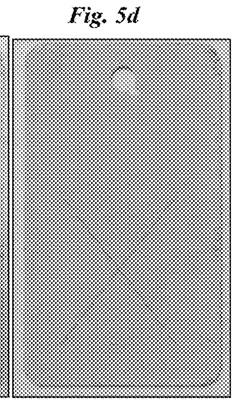
Figure 6A:
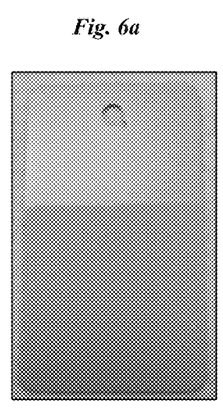
FIGS. 6(a), 6(b), 6(c), 6(d) and 6(e) show a chromate-free coating system of the present invention with Topcoat B of Example 3 cured at 450 degrees F. for 2 hours and immersed in an aqueous solution of 22 weight % NaCl after 100, 240 and 432 hours of exposure, followed by adhesion tests.
Figure 6B:
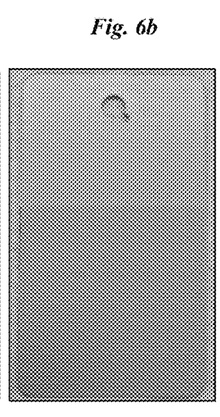
Figure 6C:
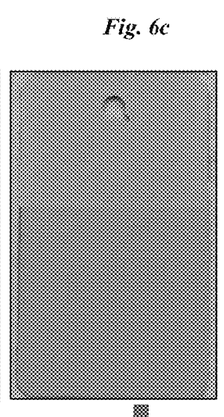
Figure 6D:
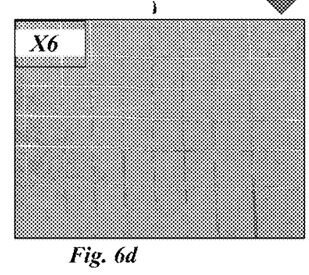
Figure 6E:
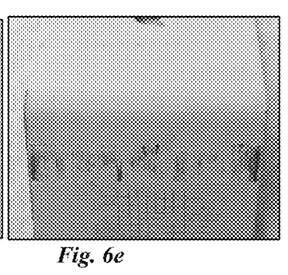

As disclosed in the parent U.S. patent application Ser. No. 16/163,893, typical microstructure of the basecoats used in the present invention shown in FIG. 2, demonstrates that the burnished basecoat comprises Ce-containing phase derived from the treatment with the colloidal solution of nano-sized $CeO_2$, said Ce-containing phase being distributed throughout the whole depth of the coating and substantially concentrated on the surface of Al particles embedded in the coating matrix. This surface phase, as Applicants believe, without being bound by any particular theory, prevents interaction of Aluminum particles with the acidic topcoat slurry compositions of the present invention, thus rendering chemical compatibility between the basecoat and the topcoat layers.

The base coat of the coating system of the present invention is generally applied to a thickness of between 0.5 to 3.0 mils, with a preferable thickness between 1.0 to 2.0 mils. Such a coating thickness can be built up in one layer (i.e., one application-drying-curing cycle), or preferably in two layers with two cure cycles. The minimum thickness is determined by a need to provide a continuous layer covering a substrate. The maximum thickness of the basecoat layer is generally determined by a targeted or specified thickness of the entire multilayer overlay system. It is customary and desirable not to apply a coating in excess of functional requirements for a defined service application.

The top coating slurries of the present invention are then applied to the base coat to form the coating systems of the present invention. In a preferred embodiment, the top coating is applied to a thickness of between 0.1 to 0.5 mils, with a more preferable thickness between 0.1 to 0.3 mils.

The curing regime required for the top coatings of the present invention can be in the range from 450 degrees F. for about two hours to 330 degrees F. for 3-4 hours. As evident to one of skill in the art, applicable curing regimes may include higher temperatures for shorter time or lower temperatures for longer time.

As will be shown and discussed hereinbelow in the Examples, the inventors have performed extensive testing to confirm that the Cr(VI)-free top coat slurry compositions of the present invention, when employed in conjunction with the basecoats disclosed in the parent U.S. patent application Ser. No. 16/163,893, produced fully cured basecoat-topcoat coating systems at reduced temperatures of below 500 degrees F. The coatings met performance requirements established by OEM specifications for low-temperature cured legacy Cr(VI) containing SermeTel® coatings currently employed in the field, such as corrosion protection for components composed from materials that cannot be exposed to the normal SermeTel® cure temperatures of above 500 degrees F. The basecoats were produced from the basecoat slurries comprising lithium-doped potassium silicate binder filled with Aluminum metal particles and treated with the colloidal solutions of nano-sized ceria.

In particular, a battery of specific, rather demanding tests was performed to evaluate protective properties of the coatings of the present invention. Typically, OEM requirements include relatively high corrosion resistance, sacrificial toward base metal (i.e., coated and scribed "X" panels should not show any metal substrate rusting for up to 1,000 hours in ASTM B117 Salt Spray tests), as well as resistance to hot water and engine fluids exposure.

Each of the coatings in the Examples below were applied onto respective substrates and cured at reduced temperatures of below 500 degrees F. Specifically, panels of low-carbon 1008/1010 steel or 4130 low-alloy steel were initially surface treated by grit-blasting with 100 mesh grit. The basecoat slurry composition of the parent U.S. patent application Ser. No. 16/163,893 was then sprayed onto the panels. Thereafter, the slurry was allowed to dry at 175° F. for 15 min, treated with the colloidal solution of nano-sized ceria and then cured at 330-450 degrees F. to form a coating layer. The base coat was applied in two layers (with two cure cycles) to a total thickness of about 1.1-1.7 mils. Then, to render the basecoats conductive, the cured coatings were grit-burnished with 220 mesh $Al_2O_3$ media after applying and curing the first and/or the second basecoat layer. Several different topcoat slurries were then applied to achieve a total thickness of 0.1-0.3 mils; dried at 175° F./15 min; and cured at 450 degrees F. for about two hours to 330 degrees F. for 4 hours.

Mechanical and functional properties of the prepared coatings were tested as follows. Coatings adhesion to a substrate and inter-layer adhesion were tested by cross-hatch tape (per ASTM D3359) and bend tests. In ASTM D3359 test method, a crosscut grid of scribe lines 1 mm apart was cut into the coating through to the substrate. Standard adhesive tape as defined by ASTM D3359 was then applied to the grid and peeled back at 180° angle. Adhesion was determined by the amount of coating removed by the tape. Also, optical microscope evaluation (×6) of the cross-hatch region was performed and found to be very informative. In the bend test, a 90° bend of a coated panel around a 0.22" diameter mandrel was performed followed by evaluation of the area around the bend for any defects such as cracking, peeling or delamination.

Salt Spray testing of scribed coatings on low-carbon steel (1008/1010 steel) panels was performed per ASTM B117 for at least 1000 hours, and in some cases, over 2,000 hours.

With regards to the boiling water resistance test, coatings on low-carbon steel panels were placed in boiling $H_2O$ for 10 min, then cooled and air-dried for 3 hours, followed by cross-hatch and bend adhesion tests performed as described herein above. It is important to emphasize that all chromate-free coating systems of the present invention have passed the boiling water resistance test, which is recognized as a very severe test that uncovers any deficiencies in a coating curing completion, its continuity, sufficiency in pore sealing and coherence. Applicants did not observe any change in visual appearance of the coatings after submersion into boiling $H_2O$. In other words, no blisters, chalking or delamination was observed. Further, no deterioration in cross-hatch adhesion (same 5B rating) was observed, and no coating cracking or delamination was observed in the bend tests. Representative test results will be demonstrated in the Examples below.

Hot water resistance was also tested by immersing the coated basecoat-topcoat panels into $H_2O$ at 80 degrees C. (175 degrees F.) for 100 hours, followed by cross-hatch and bend adhesion tests. It is important to notice that this is a very aggressive accelerated test; the test uncovers topcoat sealing capabilities, thus demonstrating capabilities of the coating system as a whole withstand water penetration. Representative test results will be demonstrated in the Examples below.

Resistance to an aqueous solution of sodium chloride was tested by immersion of coated low-carbon steel panels in 22 weight % NaCl solution for 100 hours at room temperature.

The fuel resistance test was performed on coated low-carbon steel panels immersed in Fuel B fluid for 4 hours at room temperature, followed by cross-hatch and bend adhesion tests performed as described hereinabove.

Also, resistance to hydraulic fluid has been tested on coated panels by immersion in Skydrol 500 for 100 hours at test temperature of 160 degrees F.

It should be understood that all the slurries of the present invention were characterized by their pH, viscosity, specific gravity and solids content. These parameters, together with D50 and D90 (that are diameters of $50^{th}$ percentile of the pigment particle size distribution and the $90^{th}$ percentile of the particle size distribution, respectively) were monitored to test stability and aging of the slurries. It was found that the slurries demonstrated acceptable stability and a shelf life of six months and longer.

While the preferred embodiments of the inventive slurry and coating formulation has been set forth hereinabove, the following Examples are intended to provide a basis for better understanding of properties and functions of the inventive slurries and coatings, as well as to demonstrate that said coatings perform on par with the benchmark Cr(VI) containing low-temperature cured coating systems, such as SermeTel® 984/985 system. However, the following examples are not to be construed as limiting the invention.

The same chromate-free basecoat slurry was employed in all Examples; the basecoat slurry was prepared and applied, as described in detail in the parent U.S. application Ser. No. 16/163,893. Two layers of the basecoat were applied, with each layer cured at a reduced temperature of 330-450 degrees F.; the curing regime will be specified in each of the Examples. The total basecoat thickness employed in the Examples below was in the range from 1.2 to 1.7 mils.

Example 1

First, the following aqueous composition was prepared, which will be further designated in the following Examples as Binder A. The aqueous solution was prepared by the addition of 342 grams of H3PO4 (85 weight % aqueous solution) into 576 gram of distilled $H_2O$, and then adding under mixing 115 grams of Chromium (III) Nitrate Nonahydrate (99%, Sigma-Aldrich) and 150 gram of Mg Carbonate (MagCarb®-L, Hallstar) to adjust the final pH of Binder A into pH=1.5-1.6 range. The binder also contained 26 grams of $B_2O_3$. Specific gravity (SG) was measured as SG=1.34.

The basecoat used in the present invention was applied on the substrates and cured at 450 degrees F. for 2 hours. The basecoat was applied in two cured layers and burnished after the first and after the second basecoat layer (Class 3 and Class 4 process route, respectively). Top coating slurry A was free of inorganic oxide pigment particles and was prepared as follows. Binder A was mixed with the cure accelerating quaternary ammonium hydroxide: 9 mL of 20 weight % aqueous solution of MTEAH (Avanta™ AC 4470 from SACHEM) was added to 100 mL of Binder A. The mixture was applied to the basecoat used in the present invention, then cured at 450 degrees F. for 2 hours, i.e. under the same curing regime as the basecoat. The obtained coating system formed a consistent, defect-free layer, with a very smooth surface (Ra=15-20 microinch). The coated panels from both Class 3 and Class 4 were submerged into boiling water for 10 minutes, and then dried and inspected visually. No signs of coating deterioration, such as blisters or delamination, and no loss of color or signs of chalking were detected. After about 12 hours, the same panels were tested by cross-hatch and bend tests. According to the results (FIGS. 3a, 3b, 3c and 3d), the coating system with Topcoat A of the present invention preserved excellent adhesion to the substrate and interlayer adhesion.

Example 2

Two different samples of Binder A were analyzed for the content of chromium species—one was a freshly prepared batch, and another one was 5.6 months old. A very sensitive method (with detection limit of 1 part per million) was employed for determination of hexavalent Cr(VI), namely a colorimetric analysis using diphenylcarbazide as a colorimetric reagent—this method is well established and widely used in the art for quantitative analysis of trace metals, specifically for Cr(VI) species. The results are presented in Table 1. As seen from the data, the topcoat compositions of the present invention are hexavalent chromium-free and stable: no oxidation reaction was observed to take place in time and to cause Cr(III)⇒Cr(VI) transition in the aqueous solutions of the present invention.

TABLE 1

| Chemical analysis of Binder A for chromium species | | |
|---|---|---|
| Binder A | Cr (VI) content | Cr (III) content |
| As prepared | <1 ppm | 1.29% |
| After 5.6 months | <1 ppm | 1.32% |
| Analysis Method | Colorimetric | ICP |

Example 3

Top coating slurry B was prepared by mixing of 48 grams of $TiO_2$ pigment (INEOS Pigments, Inc.) and 4 grams of Cab-O-Sil® M5 fumed silica into 400 grams of Binder A. Slurry B had a final pH=1.8, with the pigment particle size in the slurry being characterized as D50 of about 1.5 micron and D90 of about 2 micron. Then, 100 mL of the slurry was mixed with 9 mL of 20 weight % aqueous solution of MTEAH (Avanta™ AC 4470 from SACHEM), thus forming top coating slurry B of the present invention.

The basecoat used in the present invention was applied on the substrates and cured at 450 degrees F. for 2 hours. The basecoat was applied in two cured layers, burnished after the first and after the second basecoat layer (Class 3 and Class 4 process route, respectively). The thickness of the basecoat was measured as 1.3-1.4 mils (33-35 microns). Top coating slurry B was applied to the basecoat, then cured at 450 degrees F. for 2 hours. (i.e. under the same curing regime as the basecoat). The obtained coating system formed a consistent, defect-free and smooth layer (Ra=20-25 microinch), with the total thickness of 1.5-1.6 mils (38-40 microns).

The coated panels from both Class 3 and Class 4 were submerged into boiling water for 10 minutes, and then dried and inspected visually. No signs of coating deterioration, such as blisters or delamination, and no loss of color or signs of chalking were detected. After about 12 hours, the same panels were tested by cross-hatch and bend tests. According to the results (FIGS. 4a, 4b, 4c and 4d), the coating system with Topcoat B of the present invention preserved excellent adhesion to the substrate and interlayer adhesion.

Example 4

The low-carbon steel panels were coated with the basecoat-topcoat B of the present invention as described in Example 3, cured at 450 degrees F. for 2 hours, scribed to expose a base metal in the scribe and subjected to the Salt Spray test. As seen in FIG. 5, the coating system of the present invention demonstrated an outstanding resistance to wet chloride corrosion attach. No blistering was observed visually. Additionally, no red rust formation was observed visually in the field and in the scribe after 2,870 hours of testing—which is almost three times longer than specified by OEM's performance specifications.

Example 5

The low-carbon steel panels were coated with the basecoat-topcoat B of the present invention as described in Example 3, cured at 450 degrees F. for 2 hours and immersed in 22 weight % NaCl solution for over 400 hours; then the panels were removed, dried overnight at room temperature and subjected to the adhesion tests. As seen from the test results presented in FIGS. 6(a), 6(b), 6(c), 6(d) and 6(e), the coating system of the present invention performed very well in this immersion test. There was no blistering or coating delamination observed visually, neither below nor above immersion line, after more than 400 hours of immersion, and the immersed coating preserved excellent adhesion to the substrate and interlayer adhesion.

Example 6

Figure 7A:
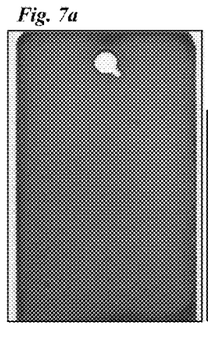
FIGS. 7(a), 7(b) and 7(c) show a chromate-free coating system of the present invention after the coating system was immersed in $H_2O$ at 80° C. for 100 hours, followed by adhesion tests, whereby the coating system includes Topcoat A of Example 1 cured at 450 degrees F. for 2 hours, and Topcoat A applied on the basecoat used in the present invention after said basecoat was burnished per a Class 4 process.
Figure 7B:
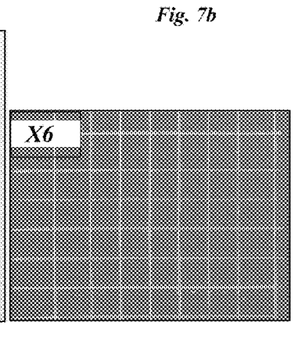
Figure 7C:
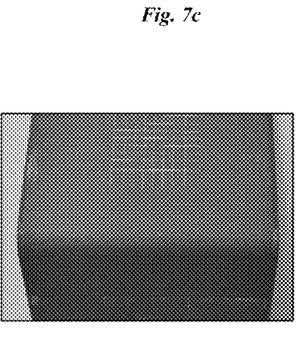
Figure 8A:
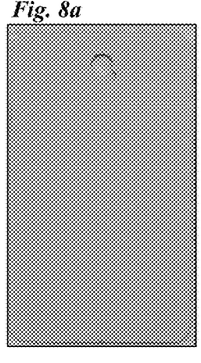
FIGS. 8(a), 8(b), 8(c), 8(d), 8(e) and 8(f) show a chromate-free coating system of the present invention with Topcoat B of Example 3 cured at 450 degrees F. for 2 hours, whereby Topcoat B is applied on the basecoat used in the present invention after said basecoat was burnished per Class 3 and Class 4 process, respectively, and the coating system was immersed in $H_2O$ at 80° C. for 100 hours, followed by adhesion tests.
Figure 8B:
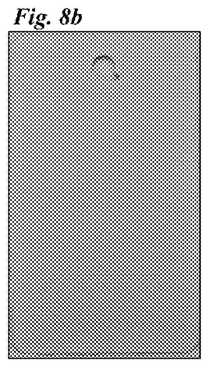
Figure 8C:
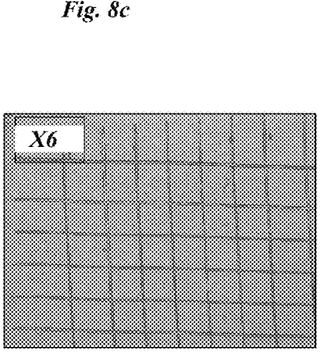
Figure 8D:
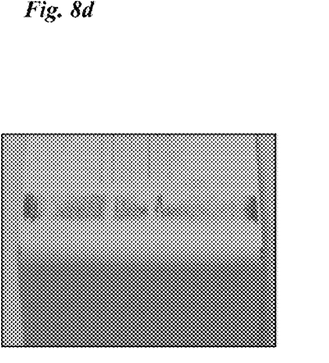
Figure 8E:
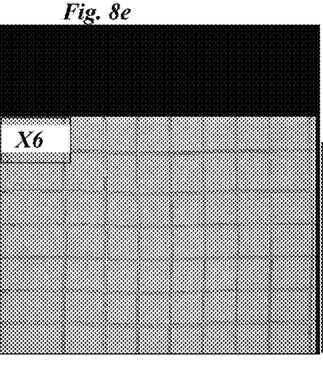
Figure 8F:
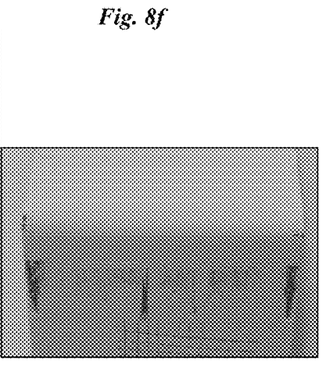

The low-carbon steel panels were coated with the basecoat-topcoat A of the present invention as described in Example 1, cured at 450 degrees F. for 2 hours and subjected to immersion in $H_2O$ at 80 degrees C. (175 degrees F.) for 100 hours; then the panels were removed, dried overnight at room temperature and subjected to the adhesion tests. As seen from the test results presented in FIGS. 7(a), 7(b) and 7(c), the coating system of the present invention passed this extreme test. No blistering or coating delamination was visually observed, and the coating system of the present invention preserved excellent adhesion to the substrate and interlayer adhesion.

Example 7

The low-carbon steel panels were coated with the basecoat-topcoat B of the present invention as described in Example 3, cured at 450 degrees F. for 2 hours and subjected to immersion in $H_2O$ at 80 degrees C. (175 degrees F.) for 100 hours; then the panels were removed, dried overnight at room temperature and subjected to the adhesion tests. As seen from the test results presented in FIGS. 8(a), 8(b), 8(c), 8(d), 8(e) and 8(f), the coating system of the present invention passed this extreme test. No blistering or coating delamination was observed visually, and the coating system of the present invention preserved excellent adhesion to the substrate and interlayer adhesion.

Example 8

Figure 9A:
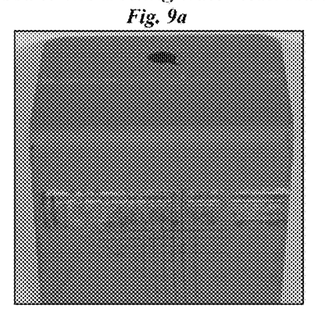
FIGS. 9(a) and 9(b) illustrate Example 8 in which the chromate-free coating system of the present invention with Topcoat A and Topcoat B was cured at 330 degrees F. for 4 hours and exposed to the boiling water test, followed by adhesion tests.
Figure 9B:
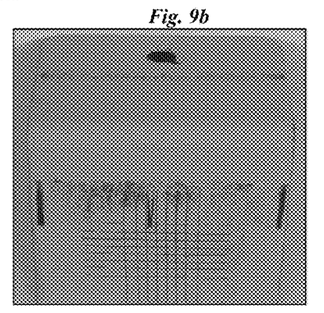
Figure 10A:
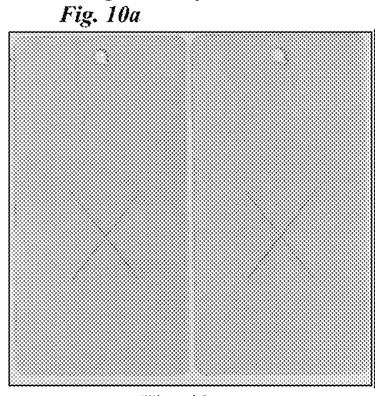
FIGS. 10(a) through 10(d) show salt spray test results for the chromate-free coating system with Topcoat B cured at 330 degrees F. for 4 hours, as described in Example 9, after samples were subject to 360, 598, 696 and 1,114 hours of exposure.
Figure 10B:
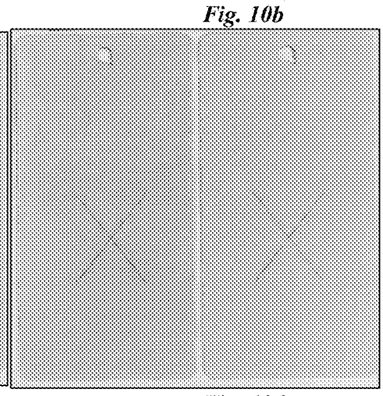
Figure 10C:
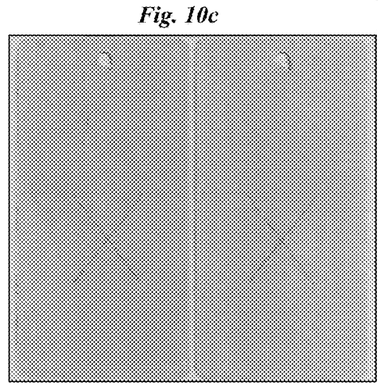
Figure 10D:
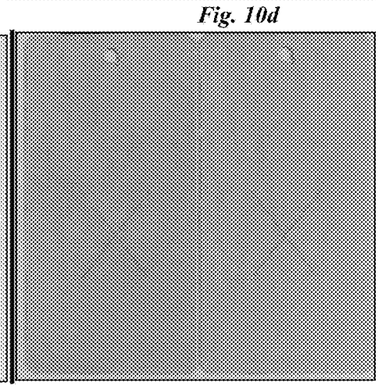

The low-carbon steel panels were coated with the basecoat used in the present invention, cured at 330 degrees F. for 4 hours and burnished after curing the second basecoat layer (i.e. by Class 4 processing). Then, the pigment-free Topcoat A was prepared as described in Example 1 and applied onto one set of panels. The second set of panels was coated with the pigmented Topcoat B prepared as described in Example 3. Both sets of the coated panels were then cured at 330 degrees F. for 4 hours; the cured coatings were submerged into boiling water for 10 minutes, and then dried and inspected visually. No signs of coating deterioration, such as blisters or delamination, and no loss of color or signs of chalking were detected. Subsequently, the panels were tested by cross-hatch and bend tests. According to the results, the coating systems, both with Topcoat A (FIG. 9a) and Topcoat B (FIG. 9b) of the present invention preserved excellent adhesion to the substrate and interlayer adhesion. The data demonstrated that the hexavalent chromium-free coating systems of the present invention are capable of achieving a full cure at very low cure temperatures, namely as low as 330 degrees F. (165 degrees C.), which represents the cure temperature for the legacy Cr(VI)-containing SermeTel® 984/985 low-cure coating system.

Example 9

The low-carbon steel panels were coated with the basecoat-topcoat B of the present invention as described in Example 3, cured at 330 degrees F. for 4 hours, scribed to expose a base metal in the scribe and subjected to the Salt Spray test. As seen in FIG. 10, the coating system of the present invention demonstrated an outstanding resistance to wet chloride corrosion attach. There was no blistering and no red rust formation observed visually in the field and in the scribe after more than 1,000 hours of testing. The performance met requirements specified by the OEM's specifications.

Example 10

Figure 11A:
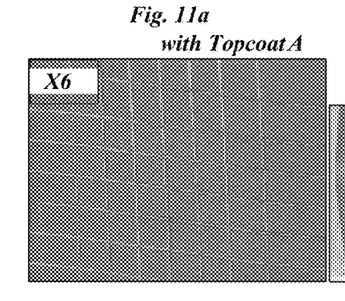
FIGS. 11(a), 11(b), 11(c) and 11(d) demonstrate results of the test as described in Example 10, whereby the chromate-free coating system of the present invention with Topcoat A and Topcoat B was cured at 330 degrees F. for 4 hours, and then immersed in Skydrol 500 at 160° F. for 3 hours, followed by the adhesion tests.
Figure 11B:
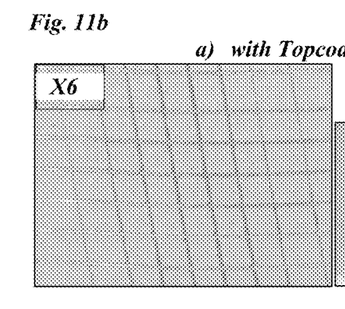
Figure 11C:
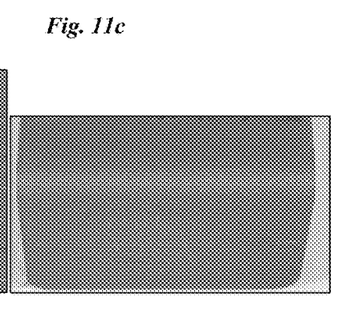
Figure 11D:
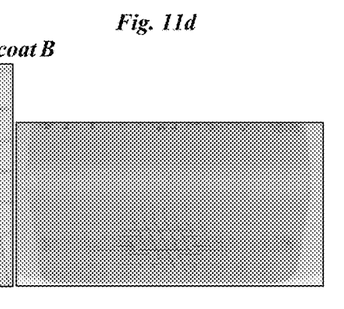
Figure 12A:
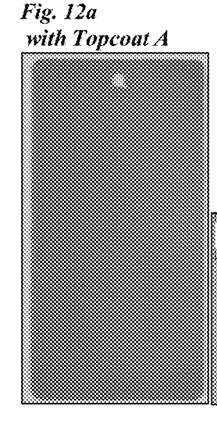
FIGS. 12(a), 12(b), 12(c) and 12(d) demonstrate results of the test as described in Example 11 whereby the chromate-free coating system of the present invention with Topcoat A and Topcoat B was cured at 330 degrees F. for 4 hours, and then immersed in Royco 500 at 300° F. for 100 hours, followed by the cross-hatch adhesion test.
Figure 12B:
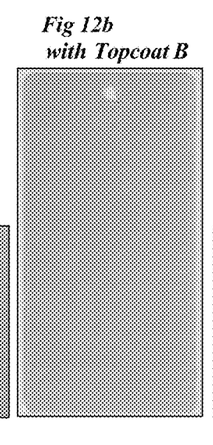
Figure 12C:
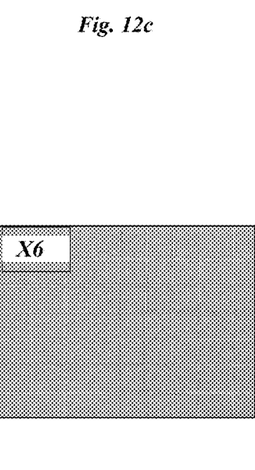
Figure 12D:
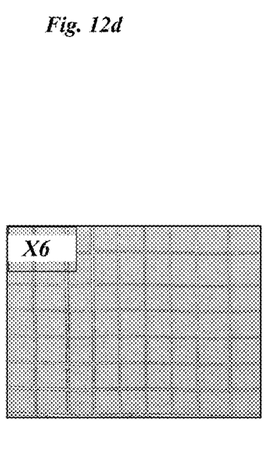

The low-carbon steel panels were coated with the basecoat used in the present invention, cured at 330 degrees F. for 4 hours and burnished after curing the second basecoat layer (i.e. by Class 4 processing). Then, the pigment-free Topcoat A was prepared as described in Example 1 and applied onto one set of panels. The second set of panels was coated with the pigmented Topcoat B prepared as described in Example 3. Both sets of the coated panels were then cured at 330 degrees F. for 4 hours; the cured coatings were immersed into a hydraulic fluid Skydrol 500 at 160 degrees F. for 3 hours, and then dried and inspected visually. No signs of coating deterioration, such as blisters or delamination, and no loss of color or signs of chalking were detected. After that, the panels were tested by cross-hatch and bend tests. According to the results, the coating systems, both with Topcoat A (FIG. 11a and FIG. 11c) and Topcoat B (FIG. 11b and FIG. 11d) of the present invention were resistant to the hydraulic fluid and preserved excellent adhesion to the substrate and interlayer adhesion.

The same results of high resistance to Skydrol 500 were observed for the coating systems of the present invention that employed Topcoat A and Topcoat B cured at 450 degrees F. for 2 hours, (i.e., at a higher temperature-shorter cure time regime).

Example 11

The low-carbon steel panels were coated with the coating systems of the present invention, as described in the Example 8, employing Topcoat A or Topcoat B and cured at 330 degrees F. for 4 hours. The cured coatings were immersed into Royco 500 lubricating oil; the test was performed at 300 degrees F. for 100 hours, then the coatings were inspected visually and tested by cross-hatch adhesion test (FIG. 12a, FIG. 12b, FIG. 12c and FIG. 12d). No signs of coating deterioration, such as blisters or delamination were visually observed, and no signs of chalking and no loss of adhesion were detected.

The same test was performed for the coating systems cured at 450 degrees F. for 2 hours, and this test also demonstrated adequate resistance of the coating systems of the present invention that employed Topcoat A and Topcoat B to Royco 500 fluid.

While it has been shown and described what is considered to be certain embodiments of the present invention, it will, of course, be understood that various modifications and changes in form or detail can readily be made without departing from the spirit and scope of the present invention. It is, therefore, intended that this invention is not limited to the exact form and detail herein shown and described, nor to anything less than the whole of the present invention herein disclosed and hereinafter claimed.

The invention claimed is:

1. A single aqueous slurry system for the production of a multilayer coating on a substrate, comprising:
   a basecoat slurry, comprising:
      a basecoat binder comprising an aqueous solution of lithium doped potassium silicate, the binder characterized by an absence of hexavalent chromium (VI);
      an aluminum powder or an aluminum alloy powder incorporated into the binder; and
      a cure catalyst comprising nano-sized cerium oxide colloidal solution; and
   a topcoat slurry, comprising:
      a topcoat binder comprising an aqueous solution of a water-soluble phosphate-based compound, nitrate anions and a water-soluble compound of trivalent chromium (III);
      a cure accelerating amine;
   wherein the topcoat slurry is characterized by an absence of hexavalent chromium (VI).

2. The aqueous slurry system of claim 1, wherein the cure accelerating amine is a quaternary ammonium hydroxide that is selected from the group consisting of tetramethyl ammonium hydroxide ((CH3)4NOH), triethylmethyl ammonium hydroxide ((CH3CH2)3 (CH3)NOH) and di ethyl dim ethyl ammonium hydroxide ((CH3CH2)2(CH3)2NOH).

3. The aqueous slurry system of claim 1, wherein the cure accelerating amine is a quaternary amine cure accelerator is in a range of about 0.1-5.0 weight % based on a total weight of the topcoat slurry.

4. The aqueous slurry system of claim 1, wherein the topcoat slurry further comprises one or more compounds that are a source of cationic species in an amount to create a pH of the aqueous slurry composition of about 1-2.5.

5. The aqueous slurry system of claim 1, wherein the water-soluble compound of trivalent chromium (III) is in a concentration that is about 1-20 weight %, based on a total weight of the topcoat slurry.

6. The aqueous slurry system of claim 1, wherein the topcoat slurry further comprising particles of a metallic oxide pigment.

7. A multilayer coating composition, comprising:
   a substrate;
   a basecoat on said substrate, said basecoat comprising:
      a ceramic basecoat matrix not containing hexavalent chromium, said ceramic basecoat matrix formed by a silicate binder, wherein said silicate binder is a potassium silicate doped with lithium;
      a plurality of aluminum-containing particles embedded within said ceramic basecoat matrix; and
      a cerium-containing compound, said cerium-containing compound impregnated into the ceramic basecoat matrix as a cerium-containing phase;
   a topcoat, said topcoat comprising:
      a topcoat ceramic matrix formed by curing a binder, said binder comprising a phosphate-based compound, nitrate containing species and a trivalent chromium (III) compound;

a cure accelerating amine;

wherein the topcoat is characterized by an absence of hexavalent chromium (VI).

8. The multilayer coating composition of claim 7, wherein the cure accelerating amine is a quaternary amine selected from the group consisting of tetramethyl ammonium hydroxide ((CH3)4NOH), triethylmethyl ammonium hydroxide ((CH3CH2)3(CH3)NOH) and diethyldimethyl ammonium hydroxide ((CH3CH2)2(CH3)2NOH).

9. The multilayer coating composition of claim 7, wherein the topcoat further comprises pigment particles of a metallic oxide embedded in the topcoat matrix.

10. The multilayer coating composition of claim 7, wherein the topcoat is chemically compatible with the basecoat.

11. A method for applying a coating system onto a substrate, comprising:

applying an aqueous one-part basecoat slurry onto a surface of the substrate to form an applied layer, said aqueous one-part basecoat slurry comprising a lithium doped potassium silicate binder, the binder characterized by an absence of hexavalent chromium (VI); and an aluminum-containing powder incorporated into the binder;

treating the applied layer of the aqueous one-part basecoat slurry with a colloidal solution of a nano-sized cerium oxide to form a basecoat layer;

curing the basecoat layer;

applying a topcoat slurry onto the basecoat layer to form a topcoat layer, said topcoat slurry comprising an aqueous solution of a water-soluble phosphate-based compound, nitrate containing species, a compound of trivalent chromium (III) and a quaternary amine cure accelerator, the topcoat slurry characterized by an absence of hexavalent chromium (VI);

curing the topcoat layer.

12. The method of claim 11, wherein the curing of the basecoat layer and the curing of the topcoat layer occurs at below about 500 degrees F.

13. The method of claim 11, wherein the curing of the basecoat layer and the curing of the topcoat layer occurs at below about 400 degrees F.

14. The method of claim 11, incorporating pigment particles of a metallic oxide into the topcoat slurry.

15. The method of claim 11, wherein the quaternary amine is selected from the group consisting of tetramethyl ammonium hydroxide ((CH3)4NOH), triethylmethyl ammonium hydroxide ((CH3CH2)3(CH3)NOH) and diethyldimethyl ammonium hydroxide ((CH3CH2)2(CH3)2NOH).

* * * * *